United States Patent [19]
Tecotzky et al.

[11] 3,791,844
[45] Feb. 12, 1974

[54] PHOSPHORS FOR MULTI-COLOR DISPLAYS

[75] Inventors: Melvin Tecotzky, Mendham; James J. Mattis, Long Valley, both of N.J.

[73] Assignee: U.S. Radium Corporation, Morristown, N.J.

[22] Filed: May 2, 1972

[21] Appl. No.: 249,559

[52] U.S. Cl.............. 117/33.5 CM, 117/100 B, 252/301.4 S, 301.4 H, 301.6 S, 313/92 PH
[51] Int. Cl....... C09k 1/00, B44d 5/00, H01i 29/20
[58] Field of Search............. 117/33.5 CM, 100 B; 252/301.4 S, 301.4 H, 301.6 S; 313/92 PH

[56] References Cited
UNITED STATES PATENTS

| | | | |
|---|---|---|---|
| 3,664,862 | 5/1972 | Kingsley et al. | 117/33.5 CM |
| 3,502,590 | 3/1970 | Royce et al. | 117/33.5 M |
| 3,582,493 | 6/1971 | Haynes et al. | 117/33.5 CM |
| 3,607,770 | 9/1971 | Rabatin | 117/33.5 CM |
| 3,619,265 | 11/1971 | Hammond | 117/100 B |
| 3,560,398 | 2/1971 | Shortes | 117/33.5 CM |
| 3,294,569 | 12/1966 | Messineo et al. | 117/33.5 CM |
| 3,522,463 | 8/1970 | Bishop | 117/33.5 CM |

Primary Examiner—William D. Martin
Assistant Examiner—William R. Trenor
Attorney, Agent, or Firm—Dean S. Edmonds

[57] ABSTRACT

A phosphor composite consists of particles each having a core of gadolinium, yttrium or lutetium oxide activated with praseodymium, substantially completely surrounded by a shell of the corresponding oxysulfide or oxyfluoride. This phosphor when deposited on the face of a cathode ray tube emits light of distinctly different colors when excited by electron beams projected at substantially different voltages. A method for making the new phosphors is also described.

15 Claims, 4 Drawing Figures

3,791,844

PHOSPHORS FOR MULTI-COLOR DISPLAYS

FIELD OF THE INVENTION

This invention relates to color display phosphors which are capable of emitting light of different colors when excited by electron beams projected at different voltages. The new phosphors are eminently suited for deposition on the face of a cathode ray tube, where they permit the display of patterns in dissimilar colors depending on the voltage of the energizing electron beam. The invention further relates to a novel method for producing color display phosphors.

BACKGROUND OF THE INVENTION

Phosphors which emit light of different colors when excited by electron beams at different voltages may be employed in various color display systems. Proposals have been made heretofore for applying conventional phosphors to cathode ray tubes in layered deposits so that excitation at different cathode ray voltages will produce light of different colors. In such layered deposits phosphors which emit in different colors are separated by barrier or dielectric layers. A color display is achieved by controlling electron penetration of the phosphor deposit, by voltage control of the electron beam. At low voltages the electrons excite the first phosphor layer which emits light of a particular color. By increasing the voltage, the electrons penetrate the barrier or dielectric layer, which is inert to electron excitation, and excite the second phosphor which emits light of a different color. It is thus possible to obtain a color display through the control of voltage in a cathode ray tube. In accordance with U.S. Pat. No. 3,204,143, for example, a multi-color display is achieved by applying multiple layers of different color emitting phosphors separated by barrier or "dead" layers of silica or mica. In accordance with U.S. Pat. No. 3,275,466, a color display is achieved by means of multiple phosphor layers each coated with an adsorpent material such as a gelatin and separated by inert layers. U.S. Pat. No. 3,294,569 describes a multiple phosphor screen composed of superimposed layers of different phosphors, each of which emits light of a different color. Between the phosphor layers are placed non-luminescent separator layers; or alternatively the outer surface of one of the phosphors is poisoned to produce a non-luminescent separator layer. In all these prior proposals, the procedures involved in producing the multi-color phosphor displays are tedious, time consuming, and difficult to control.

Instead of settling different phosphors separated by inert layers on the face of a cathode ray tube, it is possible to build up a layered phosphor particle which is composed of different phosphors separated by barrier layers. The resulting particle with multiple layers can then be settled in a cathode ray tube and will also produce a voltage sensitive screen. This technique which is described, for example, in U.S. Pat. No. 3,204,143, also is tedious, time consuming, and difficult to control.

Another approach disclosed by the prior art to obtain a voltage sensitive color display phosphor is to treat a silver-activated zinc sulfide phosphor with cadmium to produce a phosphor particle which has a varying zinc to cadmium ratio from the core of the particle to the outer surface. A phosphor particle so constructed will emit different colors when excited by electrons of different voltages. As the electrons penetrate farther into the particle, they will excite areas of the phosphor particle of increased zinc decreased cadmium content, thereby producing colors varying from red to green to blue. U.S. Pat. Nos. 3,523,905 and 3,560,398 disclose this concept. Through very careful control, it is possible to build up a phosphor particle which emits light of different hues when excited with electrons at different energy levels. However, as is shown in FIGS. 3 to 6 of U.S. Pat. No. 3,560,398, the emission spectra of this type of phosphor particles overlap extensively at the different operating voltages, so that the emitted colors are far from being distinct or saturated. These phosphors also saturate (become less bright) with increased current.

SUMMARY OF THE INVENTION

The present invention provides an improved color display phosphor comprising a phosphor composite in particulate form. Each particle of the new phosphor has a core of substantially uniform first composition substantially completely surrounded by a substantially continuous shell of a distinct substantially uniform second composition. There is no inert barrier layer between the core and shell. One of said compositions is a red emitting praseodymium activated oxide phosphor of a rare earth base selected from the group consisting of at least one of the elements gadolinium, yttrium and lutetium, and the other of said compositions is a green emitting praseodymium activated oxy-compound phosphor of the group consisting of oxysulfides and oxyfluorides of the same rare earth base as the first composition.

Preferably the first composition, which forms the core of the phosphor particle is the oxide phosphor, and the second composition which forms the shell of the composite, is the oxy-compound phosphor. However, the position of these different compositions may be reversed in the composite.

Preferably also the oxy-compound phosphor is an oxysulfide, but oxyfluorides may be used with success. In general, the oxide phosphor has substantially the chemical composition $R_{(2-y)}Pr_yO_3$ and the oxy-compound phosphor is substantially $R_{(w-y)}Pr_yO_wX$, wherein R is at least one rare earth element selected from the group consisting of gadolinium, yttrium or lutetium, X is an element selected from the group consisting of the group sulfur and fluorine, and w is 1 when X is fluorine and is 2 when X is sulfur, and y is from 0.0001 to 0.05. Thus the oxysulfide phosphors have substantially the formula $R_{(2-y)}Pr_yO_2S$ and the oxyfluoride phosphors have substantially the formula $R_{(1-y)}Pr_yOF$.

A preferred method for making the phosphor composites of the invention comprises heating, at a temperature in the range from 1,200°F. to 2,000°F., particles of a praseodymium activated oxide phosphor of at least one rare earth base selected from the group consisting of gadolinium, yttrium or lutetium together with a reactant selected from the group consisting of sulfidizing agents and fluoridizing agents, the amount of said reactant in the mixture being substantially less than the stoichiometric amount required to convert the whole of said oxide phosphor to the corresponding oxy-reactant compound. Thereafter, composite particles having an oxide core substantially surrounded by substantially continuous shell of substantially uniform oxy-reactant compound is recovered from the reaction mixture.

Any sulfidizing agent or fluoridizing agent may be used. However, preferred sulfidizing agents are sulfur dioxide plus hydrogen, hydrogen sulfide, and elemental sulfur, and preferred fluoridizing agents are alkali metal and ammonium fluorides, rare earth fluorides, hydrogen fluoride and elemental fluorine.

The above-described method of sulfidizing or fluoridizing an oxide to form a phosphor composite having an oxide core and oxy-compound shell is preferred because it is readily carried out. However, phosphor composites having an oxy-compound core and an oxide shell may be made, for example, by oxidizing the surface layer of an oxysulfide phosphor particle, or by oxidizing the surface layer of an oxyfluoride phosphor.

DESCRIPTION OF THE PREFERRED EMBODIMENTS OF THE INVENTION

The emitted color of rare earth phosphors activated by praseodymium depends upon the crystal structure and site symmetry of the activating ion in the phosphor host. It has been shown that praseodymium in a C-type cubic rare earth oxide host emits red radiation while in hexagonal or in certain distorted cubic host structures the emitted light is principally green. For example $Y_2O_3$:Pr, $Gd_2O_3$:PR and $Lu_2O_3$:PR emit red, while $Y_2O_2S$:PR, $GD_2O_2S$:Pr, $Lu_2O_2S$:Pr, $La_2O_3$:Pr, YOF: Pr, GdOF:Pr emit green light. Thus, by converting a portion but not all of a praseodymium activated oxide phosphor to the corresponding oxysulfide or oxyfluoride, a single phosphor particle can be formed which will emit light of different colors, depending on the portion of the particle which is excited. By converting the surface layer of such an oxide phosphor particle to a shell of oxysulfide or oxyfluoride, a phosphor particle is produced which will emit light of one color when excited by an electron beam of only sufficient energy to penetrate into the shell, but which will emit light of a distinctly different color when excited by an electron beam of sufficient energy to penetrate into the core of the phosphor particle.

The invention therefore provides as a new color display phosphor particles having a core of gadolinium, yttrium or lutetium oxide, surrounded by substantially a continuous and uniform shell layer of the corresponding oxysulfide or oxyfluoride. These are the preferred phosphors according to the invention, because they are relatively easy to produce, but very satisfactory phosphors may comprise instead a core of oxysulfide or oxyfluoride of gadolinium, yttrium or lutetium, and a substantial uniform shell layer of the corresponding oxide.

Praseodymium is the activator in phosphors according to the invention, for trivalent praseodymium is unique in that it produces a narrow band red emission in the cubic oxide host whereas it produces a narrow band green emission in the oxysulfide or oxyfluoride host. However, this invention does not exclude the presence, together with praseodymium, of minor amounts of other rare earth activator elements. The amount of praseodymium is conventional for rare earth activator in a rare earth host phosphor; that is it may range from 0.001 mol percent to 5 mol percent by weight of the phosphor. Ordinarily it will be in the range from about 0.01 mol percent to about 0.2 mol percent. It is present in the phosphor as a substitute for a corresponding amount of the host element, i.e. it is chemically combined with the oxygen or oxysubstituent of the phosphor similarly to the gadolinium, yttrium or lutetium host element.

Figure 1:
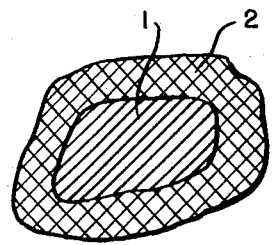
FIG. 1 is a cross section through a composite phosphor particle according to the invention.

A particle of a composite phosphor according to the invention is shown schematically in cross section in FIG. 1, on a greatly enlarged scale. The particle has a core 1 of cubic gadolinium, yttrium, or lutetium oxide, activated with praseodymium, surrounded by a substantially continuous shell 2 of oxysulfide or oxyfluoride of the same rare earth base as the core. It is important that the shell of oxysulfide be substantially continuous and be of substantially uniform (oxysulfide or oxyfluoride) composition, so that none of the oxide core extends to the surface. Otherwise, the spectral emission characteristics of each phosphor particle would depend on at least in part on where it was impinged by an electron beam and only to a limited extent on the energy of such beam.

The thickness of the shell 2 is not of particular consequence. The thicker the shell, the greater must be the energy of an electron beam to penetrate to and cause spectral emission by the core 1. Thickness of the shell thus affects excitation characteristics of the phosphor by determining the minimum energy of the electron beam required to excite the core, but it does not affect the intrinsic color display behavior of the phosphor composite. A very thick shell does have a dilution effect on the color emitted by the inner core, however; and for most purposes it is desirable for the shell to be as thin as practicable and for the inner core to be approximately of normal phosphor particle size.

The physical size of composite phosphor particles according to the invention is conventional. That is to say, the new composite phosphor particles have the same physical size and preferably are made to the same standards of uniformity of size and shape as conventional rare earth oxide phosphors have heretofor been made.

It has been found that the properties of rare earth oxysulfide phosphors may be enhanced by incorporation in the host structure a small concentration of fluorine (typically 20 to 500 parts per million). Accordingly, the invention includes within its scope host oxide and host oxysulfide structures in which such amounts of fluorine are present.

A preferred method for making phosphor particles according to the invention is to heat particles of commercial gadolinium, yttrium, or lutetium oxide phosphors, activated with praseodymium, to a temperature in the range from 1,200°F. to 2,000°F. in a vessel containing a sulfidizing agent such as sulfur dioxide plus hydrogen, hydrogen sulfide, or elemental sulfur plus hydrogen. The amount of sulfidizing agent used is substantially less than is required on a stoichiometric basis to convert all the rare earth oxide to oxysulfide. Such limitation on the amount of sulfidizing agent is important to ensure against conversion of a substantial fraction of the oxide particles wholly to oxysulfide. The heating operation is continued in a typical case for a period of time from 15 minutes to 1 hour. If the entire amount of sulfidizing agent is confined with the oxide phosphor during the heating operation, then the time of heating is not particularly critical. In such case heating is advantageously continued long enough for substantially complete consumption of the sulfidizing agent. Under these conditions substantially all oxide particles have a surface shell converted to oxysulfide, but in view of the stoichiometric deficiency of sulfidizing agent and generally uniform diffusion of the sulfidizing agent into the oxide particles, substantially all particles retain an oxide core.

If, as is also possible, the particles of oxide phosphor are heated while a flowing stream of gaseous sulfidizing agent passes over them, then the time of heating during which the sulfidizing agent is in contact with the hot phosphor particles must be limited. If in such case the flow rate of sulfidizing gas is low enough so that it is substantially all consumed by the sulfidizing reaction, then the total amount of gas admitted will be the desired stoichiometrically deficient amount. If the flow rate of such gas is great enough so that some of it passes unreacted out of the heating vessel then the total amount admitted will be enough greater so that the fraction of such total which does react will be the desired stoichiometrically deficient quantity.

By similarly treating a conventional high purity gadolinium, yttrium or lutetium oxide phosphor, activated with praseodymium, with a fluoridizing agent such as ammonium fluoride, hydrogen fluoride, or elemental fluorine, the surface of the particles may be converted to a oxyfluoride composition. Here again, the amount of fluoridizing agent used is stoichiometrically substantially less than the amount required to convert the entire charge of oxide particles to oxyfluoride, and thereby such conversion is limited to a surface shell layer or substantially all the particles while the cores of such particles remain in oxide form.

The praseodymium activator is present in the oxide particles, and remains of course in the shell layer after conversion of such layer to oxysulfide or oxyfluoride, where it functions also as an activator for the host crystal.

All phosphors according to the invention display generally similar spectral emission characteristics when excited by electron beams. The oxide component of such phosphors generally exhibits a narrow main emission band at a wave length of about 6,300 angstrom units, which is in the red portion of the visible spectrum. The oxysulfide phosphors on the other hand, exhibit a narrow main emission band at about 5,100 angstrom units, which is in the green portion of the spectrum. Phosphor particles having an oxide core and an oxysulfite or oxyfluoride shell will therefore display a green emission when excited by a low voltage electron beam which penetrates only into the shell layer, but will display a red emission when excited by a high voltage electron beam which penetrates into the core of the phosphor particles. At intermediate beam voltages both red and green emissions will occur, giving a composite yellow color to the visible radiation.

Figure 4:
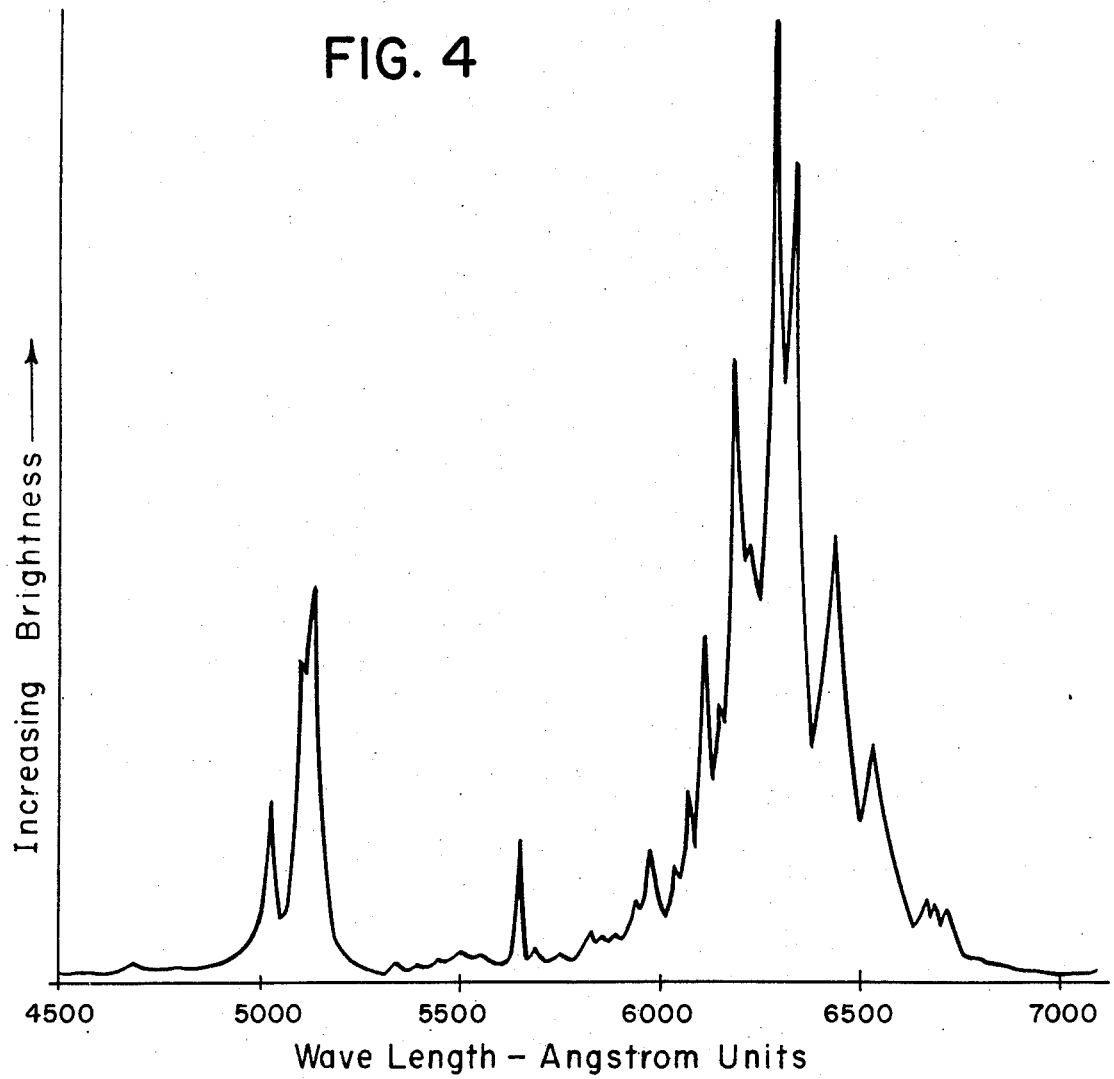
FIGS. 2 to 4 are plots showing the relative brightness of the spectral emission of a phosphor according to the invention when excited by electron beams at different voltages.
Figure 2:
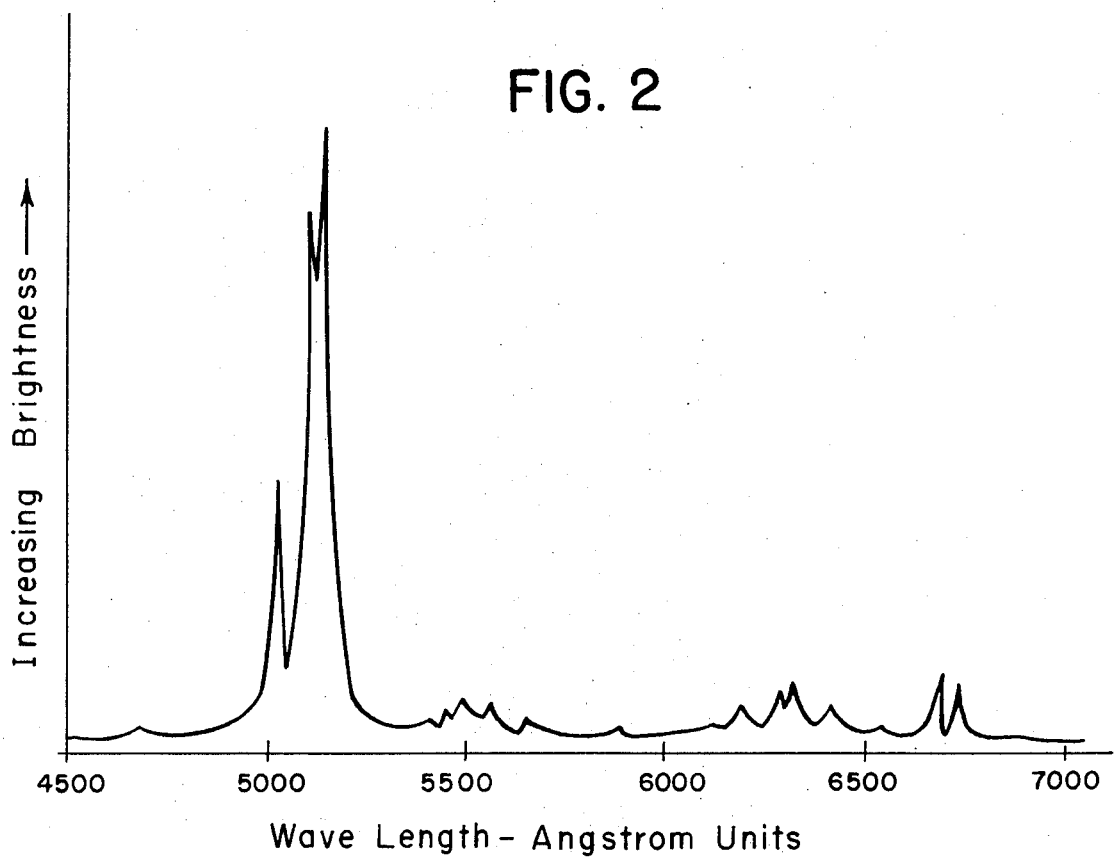
Figure 3:
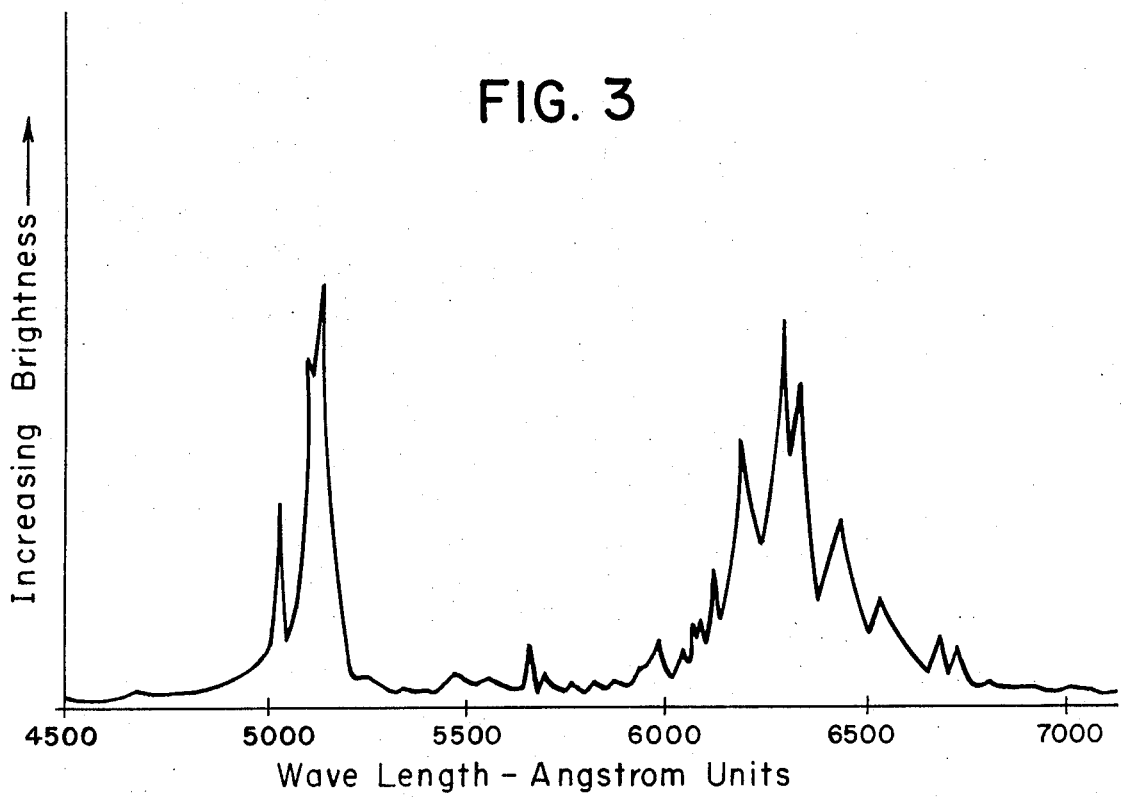

FIGS. 2 through 4 are spectral emission curves of a composite phosphor according to the invention having a praseodymium activated gadolinium oxide core and praseodymium activated gadolimium oxysulfide shell layer. FIG. 2 shows the emission characteristics of such a phosphor when excited by an electron beam of 5 kilovolts. It will be noted that there is a sharp narrow peak emission in the neighbourhood of 5,100 angstrom units, which gives a distinct green color to the visible light emitted by the phosphor under this excitation condition. FIG. 3 shows the spectral emission of the same phosphor when excited by an electron beam at 10 kilovolts. Here there are two spectral emission peaks, one at about 5,100 angstrom units and the other at about 6,300 angstrom units. Both emissions are of narrow band width, and are of about the same intensity, so that the visible light emitted by the phosphor appears distinctly yellow.

FIG. 4 is a spectral emission curve of the same phosphor when excited by an electron beam at 20 kilovolts. Here the predominant emission is about 6,300 angstrom units, with only a relatively low secondary emission peak at 5,100 angstrom units. The intense radiation at the longer wave length masks the secondary emission and gives a distinctly red color to the visible light.

The new phosphor particles are of course readily applied to the face of the cathode ray tube by standard procedures, and a principal use of such phosphors is in the manufacture of cathode ray tubes for color display systems.

Following are examples of the preparation of phosphors in accordance with the invention.

EXAMPLE 1

Approximately 30 grams of a commercial gadolinium oxide phosphor activated with praseodymium were charged into a large quartz tube of about 100 ml volume closed at one end. The tube was positioned in an electric resistance furnace. Nitrogen gas was directed into the tube at a flow rate of 120 cc. per minute to exclude air while the tube and its contents were heated to a temperature of 1,680°F. When the phosphor had attained this temperature, the nitrogen flow was supplemented by an additional flow of sulfur dioxide at the rate of 40 cc. per minute and hydrogen at the rate of 80 cc. per minute, and heating was continued for 20 minutes while the combined gases flowed over the charge in the tube. At the end of this time the flow of hydrogen and sulfur dioxide gases was discontinued and the tube was removed from the furnace and allowed to cool to room temperature. Thus about 1.15 grams of sulfur was introduced into contact with and reacted with the gadolinium oxide. This was about 40 percent of the amount required stoichiometrically to react with the whole amount of gadolinium oxide present.

The cooled phosphor particles were found to have a core of gadolinium oxide activated with praseodymium, surrounded by a substantial continuous layer of gadolinium oxysulfide activated with praseodymium. The spectral emission of this phosphor, when excited by an electron beam, conformed substantially to the curves shown in FIGS. 2 to 4.

EXAMPLE 2

Approximately 25 grams of commercial yttrium oxide phosphor particles activated with praseodymium were charged into a quartz tube, which was then placed in a resistance furnace. The charge was heated to 1,700°F. while a stream of nitrogen gas was flowed into the open end of the tube at a rate of about 120 cc. per minute. When the charge had come to a temperature of 1,700°F., hydrogen sulfide was added to the nitrogen gas stream, at a flow rate of about 50 cc. per minute, and heating continued along with admission of the hydrogen sulfide for 30 minutes. At the end of this time the hydrogen sulfide gas flow was discontinued, the tube was withdrawn from the furnace, the charge was cooled to room temperature while the nitrogen gas continued to flow. By this treatment the yttrium oxide was reacted with about 2.3 grams of hydrogen sulfide, or approximately 60 percent of the amount required stoichiometrically for complete conversion of the yttrium oxide to oxysulfide.

The resulting phosphor particles had a core of yttrium oxide activated with praseodymium. The phosphor product was eminently suitable for use as a multicolor phosphor on a cathode ray tube screen, and displayed spectral emission characteristics generally similar to those shown and described above with reference to FIGS. 2 and 4.

EXAMPLE 3

Approximately 1.0 gram of reagent grade ammonium bifluoride powder was dissolved in about 5 mls. of water. The solution was added to about 100 grams of commercial gadolinium oxide phosphor activated with praseodymium. The components were thoroughly mixed and then dried in a vacuum oven at a temperature of about 80°C. The dried powder was blended and heated to about 500°C. for about 2 hours.

By analysis of the spectral emission of this phosphor at varying voltages, it was found that the phosphor consisted of a core of yellow-green emitting gadolinium oxyfluoride activated by praseodymium surrounded by a substantially continuous layer of gadolinium oxide activated with praseodymium.

From the spectral distribution curves, it is evident that at low voltage the gadolinium oxide praseodymium phosphor, which is the outer composition of the phosphor particle, is excited by the electron beam producing the primary emission at 6,300 A. With increased voltage, the electron beam penetrates further into the particle exciting the other phosphor phase gadolinium oxyfluoride-praseodymium. This is evident from the growth of the emission peak at about 5,100 A and the decrease in the peak at 6,300 A. Thus, the phosphor of this example, when excited by an electron beam of 5 kilovolts, displayed spectral emission characteristics very similar to those shown in FIG. 4. When excited by an electron beam at 12.5 kilovolts, the spectral emission characteristics were very much as shown in FIG. 3. When excited by an electron beam at 20 kilovolts, the emission at about 5,100 angstrom units was much like that shown in FIG. 2, but in the neighborhood of 6,300 angstrom units there was a peak very substantially broader and higher than that shown in FIG. 2. However, this latter peak was lower than the 5,100 angstrom unit peak and was substantially lower than the corresponding peak at the excitation voltage of 12.5 kv.

We claim:

1. A phosphor particle having an inner core of substantially uniform first composition completely surrounded by a continuous surface layer of substantially uniform second composition, one of said compositions being a praseodymium activated oxide phosphor of a rare earth base selected from the group consisting of at least one of the elements gadolinium, yttrium and lutetium, and the other of said compositions being a praseodymium activated oxy-compound phosphor of the group consisting of oxysulfides and oxyfluorides of the same rare earth base as selected for the first composition, both said core and said surface layer displaying spectral emission upon excitation.

2. A phosphor particle according to claim 1 wherein the first composition is the oxide phosphor and the second composition is the oxy-compound phosphor.

3. A phosphor particle according to claim 1 wherein the first composition is the oxy-compound phosphor and the second composition is the oxide phosphor.

4. A phosphor particle having an inner core of substantially uniform first composition completely surrounded by a continuous shell of substantially uniform second composition, said first composition being a praseodymium activated oxide phosphor of a rare earth base selected from the group consisting of at least one of the elements gadolinium, yttrium and lutetium, and said second composition being a praseodymium activated oxysulfide phosphor of the same rare earth base as selected for the first composition, both said core and said surface layer displaying spectral emission upon excitation.

5. A phosphor particle according to claim 4 wherein the first composition is a praseodymium activated gadolinium oxide phosphor and the second composition is a praseodymium activated gadolinium oxysulfide phosphor.

6. A phosphor particle according to claim 4 wherein the frist composition is a praseodymium activated yttrium oxide phosphor and the second composition is a praseodymium activated yttrium oxysulfide phosphor.

7. A phosphor particle according to claim 4 wherein the first composition is praseodymium activated lutetium oxide phosphor and the second composition is a praseodymium activated lutetium oxysulfide phosphor.

8. A phosphor particle according to claim 1 wherein the oxide phosphor is substantially
$R_{(2-y)}Pr_yO_3$
and the oxy-compound phosphor is substantially
$R_{(w-y)}Pr_yO_wX$
where R is at least one rare earth element selected from the group consisting of gadolinium, yttrium and lutetium, X is an element selected from the group consisting of sulfur and fluorine, w is 1 when X is fluorine and is 2 when X is sulfur, and y is from 0.00001 to 0.05.

9. A phosphor particle according to claim 1 wherein the first composition is a rare earth oxide conforming substantially to the formula
$R_{(2-y)}Pr_yO_3$
and the second composition is a rare earth oxysulfide conforming substantially to the formula
$R_{(2-y)}Pr_yO_2S$
where R is at least one rare earth element of the group consisting of gadolinium, yttrium and lutetium and y is from 0.00001 to 0.05.

10. A phosphor particle according to claim 1 wherein the first composition is a rare earth oxide conforming substantially to the formula
$R_{(2-y)}Pr_yO_3$
and the second composition is a rare earth oxyfluoride conforming substantially to the composition
$R_{(1-y)}Pr_yOF$ where R is at least one rare earth element of the group consisting of gadolinium, yttrium and lutetium, and y is from 0.00001 to 0.05.

11. The method of making a phosphor which comprises heating at a temperature in the range from 1,200°F. to 2,000°F. particles of a praseodymium activated oxide phosphor of at least one rare earth base selected from the group consisting of gadolinium, yttrium and lutetium together with a reactant selected from the group consisting of sulfidizing agents and fluoridizing agents, the amount of said reactant in the mixture being substantially less than the stoichiometric amount required to convert the whole of said oxide phosphor to the corresponding oxy-reactant compound, and cooling the reaction product to room temperature, thereby forming particles having an oxide core of substantially uniform composition surrounded by a continuous surface layer of the praseodymium activated oxy-reactant compound phosphor of the same rare earth base as selected for the core.

12. The method according to claim 11, wherein the reactant is a sulfidizing agent and the recovered composite particles have a substantially continuous shell of substantially uniform oxysulfide composition.

13. The method according to claim 12 wherein the sulfidizing agent is at least one compound selected from the group consisting of sulfur dioxide plus hydrogen, hydrogen sulfide, and elemental sulfur.

14. The method according to claim 11 wherein the reactant is a fluoridizing agent and the recovered composite particles have a substantially continuous shell of substantially uniform oxyfluoride composition.

15. The method according to claim 14 wherein the reactant is at least one compound selected from the group consisting of ammonium fluoride, rare earth fluorides, hydrogen fluoride and fluorine.

* * * * *